Jan. 23, 1945. M. O. KUHN 2,367,834
ROLLING RING FOR BARRELS
Filed Jan. 18, 1943 2 Sheets-Sheet 1
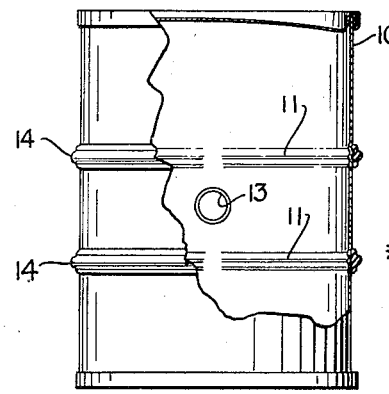
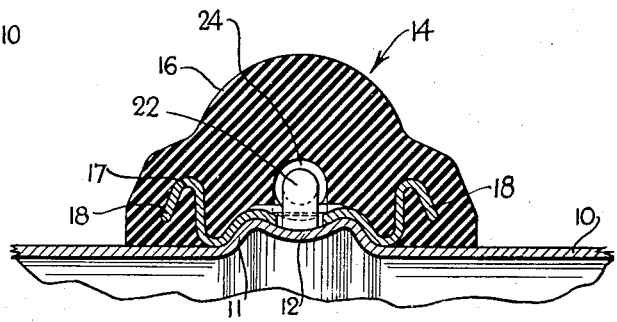
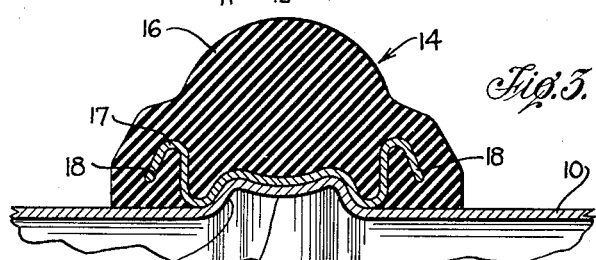
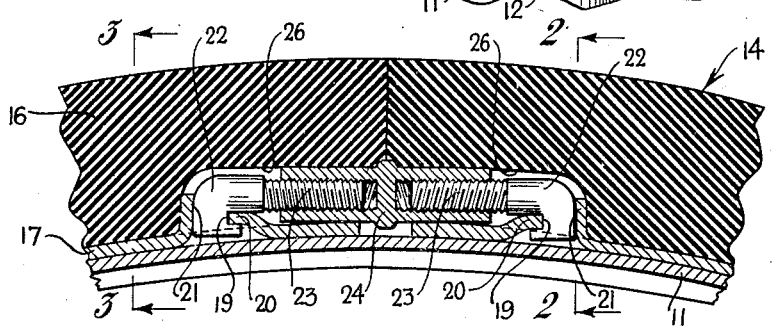
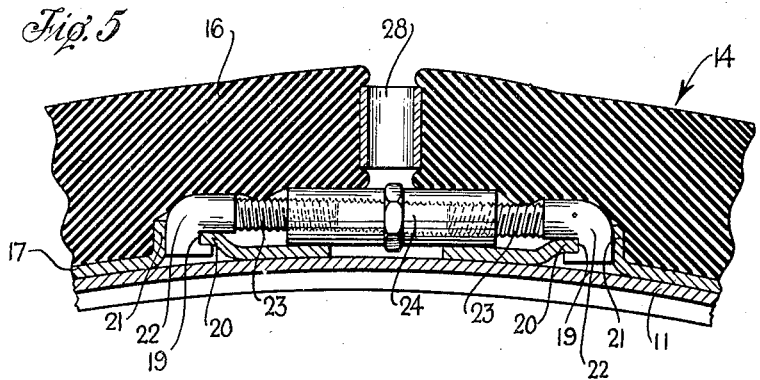
Inventor
MAX O. KUHN
By Ely & Frye
Attorneys Inventor
MAX O. KUHN Patented Jan. 23, 1945

2,367,834

UNITED STATES PATENT OFFICE 2,367,834

ROLLING RING FOR BARRELS

Max O. Kuhn, Cuyahoga Falls, Ohio, assignor to The Firestone Tire & Rubber Company, Akron, Ohio, a corporation of Ohio Application January 18, 1943, Serial No. 472,795

7 Claims. (Cl. 220—71)

This invention relates to rolling rings for barrels, such as metal barrels or drums in which liquids are stored or shipped, and more especially it relates to rolling rings of the character mentioned that are composed principally of rubber.

The use of rubber rolling rings for metal barrels has proved advantageous for the reason that such rings do not mar or damage polished wooden floors over which the barrels are rolled, and do not mar or damage the sides of other barrels or drums that may come violently into contact therewith. The problems involved in the use of rubber rolling rings for barrels include the provision of means for mounting and retaining the rings on the barrels, the provision of closely abutted ends in cases where the rolling rings are split, and the provision of means for maintaining the lateral margins of the rings in close contact with the surface of the barrel so that liquid may not enter therebetween.

The chief objects of the invention are to provide an improved rubber rolling ring for barrels; to provide in an improved manner for attaching rubber rolling rings to barrels; to provide improved metal elements for operative association with rubber rolling rings to secure the latter to barrels; to provide for concealment of the aforementioned metal elements; to obtain closely abutted ends of the rubber structure constituting a rolling ring; to provide in an improved manner for mechanically interlocking the metallic elements and the rubber elements of rubber rolling rings; and to provide for maintaining the lateral margins of a rubber rolling ring in close contact with the surface of a barrel. Other objects will be manifest as the description proceeds.

Of the accompanying drawings:

Fig. 1 is a side elevation of a metal barrel, and a pair of the improved rolling rings operatively mounted thereon, a part of the barrel and rings being broken away and in section;

Fig. 2 is a section on the line 2—2 of Fig. 4;

Fig. 3 is a section on the line 3—3 of Fig. 4;

Fig. 4 is a fragmentary central longitudinal section, on a larger scale, of the improved rolling ring shown in Fig. 1 and the barrel wall on which it is mounted, said section being taken at the abutted ends of the rubber component of the ring, and showing means for drawing together the ends of the metal element of the ring;

Fig. 5 is a section similar to Fig. 4 showing the use of means for holding apart the ends of the rubber structure while the ends of the metal element are drawn toward each other;

Figure 6:
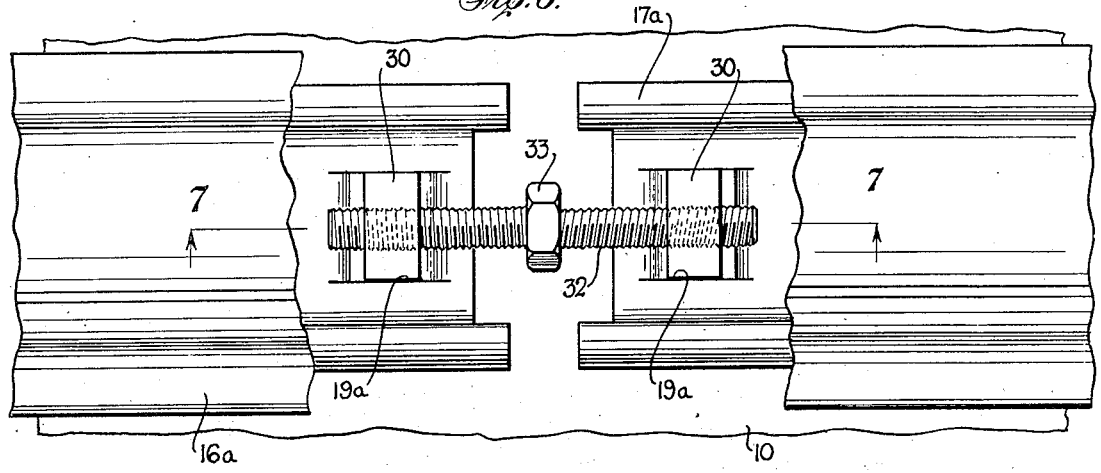
Fig. 6 is a fragmentary plan of another embodiment of the invention, a part being broken away to reveal modified means for drawing together the ends of the metal element of the ring.

Referring to Fig. 1 of the drawings, there is shown a sheet metal barrel or drum 10 of any preferred or conventional type, the wall of said drum being formed with two circumferentially disposed ribs or corrugations 11, 11, which ribs extend outwardly from the wall or shell, and are of transversely dished or concave contour in their medial circumferential region, as is best shown at 12, Figs. 2 and 3. The ribs 11 do not extend completely about the drum, but are discontinued in a narrow region thereof that is in alignment with the bung hole 13 of the drum, longitudinally of the latter as shown in Fig. 1, to enable the drum to be completely emptied. The ribs 11 serve as seats for respective rolling hoops 14, 14 that embody the invention.

Each rolling hoop 14 comprises a resilient element 16 of rubber or rubber-like composition, and a contractile metal element 17 upon which said rubber element is mounted, both of said elements being formed as split rings and the rubber element being positioned upon the outer circumference of the metal element. The metal element 17 is a longitudinally arcuate structure, which, in its medial longitudinal region is transversely shaped complemental to the contour of a drum rib 11 so as snugly to fit thereover. Each lateral marginal portion of the element 17 extends radially outwardly, parallel to the plane of the element, for a substantial distance, and there is reversely and obliquely bent so that when the rolling ring is on the drum the lateral edges of the element 17 are in spaced relation to the wall of the drum and to the adjacent radially extending portions of the element. The arrangement is such that the marginal portions of the element 17 constitute hooks 18, 18, which hooks are utilized for the retention of the resilient element 16 as presently will be explained. For retaining the metal element 17 upon a drum 10, the respective end portions of the element are incised, at points spaced from the ends thereof, and deformed outwardly to provide respective apertures 19 each having a raised tongue 20 on the side thereof nearest the adjacent end of the element, and an upstanding ear 21 on the opposite side of said aperture. Received in each aperture 19 is a hook-like member 22 that is formed with a notch or slot in which the tongue 20 at the side of said aperture is receivable. Each member 22 is integrally formed with a threaded stem 23, the two stems being directed toward each other and formed respectively with a right hand thread and a left hand thread. Engaging the threaded stems 23 and spanning the space between the confronting ends of the metal member 17 is a turnbuckle 24, the same being provided with the usual medial hexagonal portion for engagement with a suitable wrench (not shown). By means of said turnbuckle the metal element 17 may be drawn tightly about the drum 10, upon a rib 11 thereof, the confronting ends of said element standing slightly apart, as shown in Fig. 4, when the turnbuckle is fully tightened.

The resilient element 16 may be composed of vulcanized rubber composition, or any other resilient composition having similar or comparable characteristics. The element 16 originally is made in longitudinally straight form, but is arranged to be mounted upon the metal element 17, and to assume the longitudinally arcuate form of the latter, prior to being mounted upon a drum 10. In transverse shape the element 16 has a substantially half-round portion that is outwardly presented when the element is mounted for use, and which constitutes the tread or wear-surface of the element. The opposite face of the element, that is, the face that is inwardly presented during use, is shaped complemental to the outer surface of the metal element 17, and has lateral portions adapted to be deformed and snapped under the marginal hooks 18 of said element 17, the inner circumferential faces of the lateral portions of element 16 being shaped to rest flush upon the surface of the drum 10 as shown. The length of the resilient element 16 is somewhat greater than the length of the metal member 17 so as to extend slightly beyond the respective ends of the latter, and the respective end portions of element 16 are recessed on the under sides thereof, as shown at 26, 26, to provide space for the reception of the threaded hooks 22 and the turnbuckle 24.

In the mounting of the improved rolling ring upon a drum, the resilient element 16 is mounted upon the metal element 17 before the ring is applied to the drum, the split nature of the ring enabling it to be distended sufficiently to slip over a drum-rib 11. The turnbuckle 24 then is started onto the threaded stems 23. This operation is facilitated by the fact that the hook-like members 22 are somewhat loosely received in the apertures 19 of the metal element 17, so that threaded stems 23 may be brought into axial alignment without difficulty notwithstanding the fact that the ends of the ring are spaced apart from each other. Because the resilient element 16 is longer than the metal element 17, it is necessary to hold the ends of said resilient element apart from each other until the turnbuckle is fully set up, and to this end a slotted device 28, Fig. 5 is positioned temporarily between the ends of said resilient element. The slot in said device 28 enables the turnbuckle to be set up by means of a tool inserted through said slot. When the turnbuckle is fully set up, the device 28 is withdrawn, whereupon the confronting ends of the resilient element move together, preferably tightly enough to place the adjacent regions of the structure under slight compressive stress so that a closed juncture is assured at all times.

The invention provides a rolling ring that is of simple construction, that is easily applied to a barrel or drum, that has its marginal surfaces held tightly against the drum, which has a metal structure so enclosed as to be protected from impact and from contact with corrosive fluids, and which achieves the other advantages set forth in the foregoing statement of objects.

Figure 7:
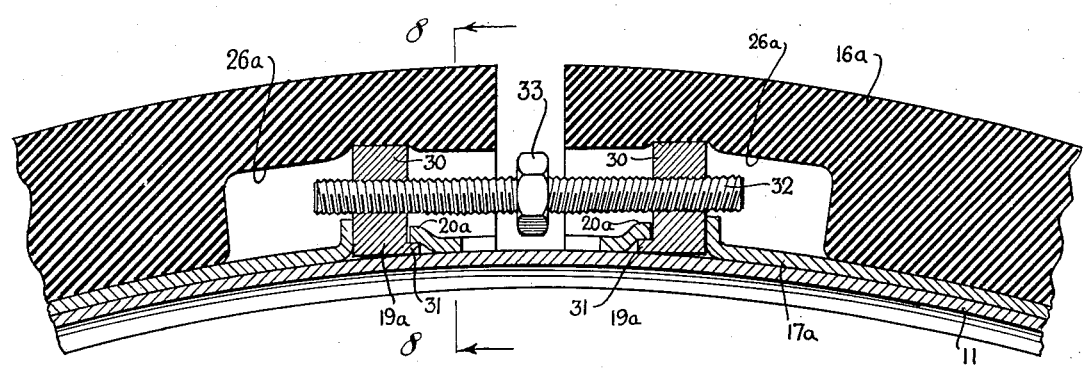
Fig. 7 is a central longitudinal section of the structure shown in Fig. 6, before the ends thereof are drawn together, taken on line 7—7 of Fig. 6.
Figure 8:
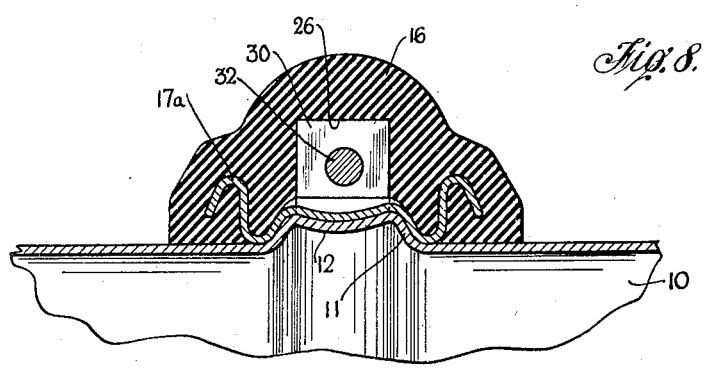
Fig. 8 is a section on the line 8—8 of Fig. 7.

The modified embodiment of the invention shown in Figs. 6 to 8 inclusive is essentially similar to the embodiment previously described, and differs therefrom solely in the means employed for drawing together the confronting ends of the metal element of the ring. Thus the resilient element 16a may be identical with the resilient element 16 previously described except for the size and shape of the recesses 26a, 26a at the respective ends thereof. The metal element 17a may be identical with metal element 17 except that the apertures 19a in the respective end portions thereof are somewhat nearer the end margins of the element. Loosely received in said apertures 19a are respective anchor blocks 30, each block formed with a flange 31 at its lower margin for engagement with the lip 20a at the side of the aperture 19a. Each anchor block 30 is formed with a threaded bore in which is received an end of a screw element 32, one end of the latter being formed with right hand threads and the other end being formed with left hand threads. The said screw element 32 is centrally formed with an integral hexagonal formation 33 by means of which it is rotated by any suitable tool, such as a wrench.

The modified embodiment of the invention is mounted upon a barrel or drum in exactly the same manner as the embodiment first described, and it possesses substantially all the advantages of the latter.

Other modification may be resorted to without departing from the spirit of the invention, or the scope thereof as defined by the appended claims.

I claim:

1. In a rolling ring for barrels or drums, the combination of a metal element consisting of a split ring so shaped as to circumscribe a barrel or drum with only its medial region in contact with the surface thereof, a resilient element consisting of a split ring of rubber or rubber-like material positioned over the perimeter of the metal element and united therewith solely by mechanical interlock with the marginal portions thereof, and means for drawing the ends of the metal member toward each other.

2. In a rolling ring of the character described, the combination of a split metal ring so shaped as to circumscribe a barrel or the like with only its medial region in contact with the surface thereof, a split ring of resilient material positioned over the periphery of the split metal ring so as to conceal the latter and having portions extending transversely around the lateral marginal portions of the metal ring and constituting the sole means uniting said rings, and means for drawing the ends of the metal member toward each other whereby the rolling ring is constricted about a barrel with portions of the resilient element confined between the barrel wall and the lateral marginal portions of the metal ring.

3. In a rolling ring of the character described, the combination of a transversely split metal ring adapted to circumscribe a circumferentially ribbed barrel or drum, said split metal ring having its medial longitudinal region shaped complemental to a barrel rib so as to fit thereupon and having its lateral marginal portions extended radially outwardly and reversely bent radially inwardly to constitute inwardly opening hook portions, a split ring of resilient material positioned upon the periphery of the split metal ring and having lateral portions extending around the hook portions of the metal ring to effect a mechanical interlock therewith that constitutes the sole union of the two rings, and means for drawing together the confronting ends of the metal ring.

4. In a rolling ring of the character described, the combination of a split metal ring adapted to circumscribe a barrel or the like, a split ring of resilient material mounted upon the periphery of said metal ring and confining the metal ring between itself and the surface of the barrel, and means including threaded elements for drawing the confronting ends of the structure toward each other to constrict it about a barrel, said means including respective hook-like elements engaging the respective end portions of the metal ring and movable relatively thereof so as to enable them to be axially aligned with each other.

5. A combination as defined in claim 4 wherein the ring of resilient material is longer than the metal ring and projects beyond the ends thereof to enable the ends of the resilient ring to be forced together and thereby subjected to compressive stress whereby a tight juncture is assured.

6. A combination as defined in claim 4 wherein the hook-like elements comprise respective right hand and left hand screw-threaded stems, and a turnbuckle engaging said stems.

7. A combination as defined in claim 4 in which the hook-like elements are formed with threaded bores, and a turnable threaded member having right hand and left hand screw threads engaged in said bores.

MAX O. KUHN.